March 19, 1968    W. OSTBERG ETAL    3,373,883
BARGE UNLOADING SYSTEM
Filed Nov. 17, 1966
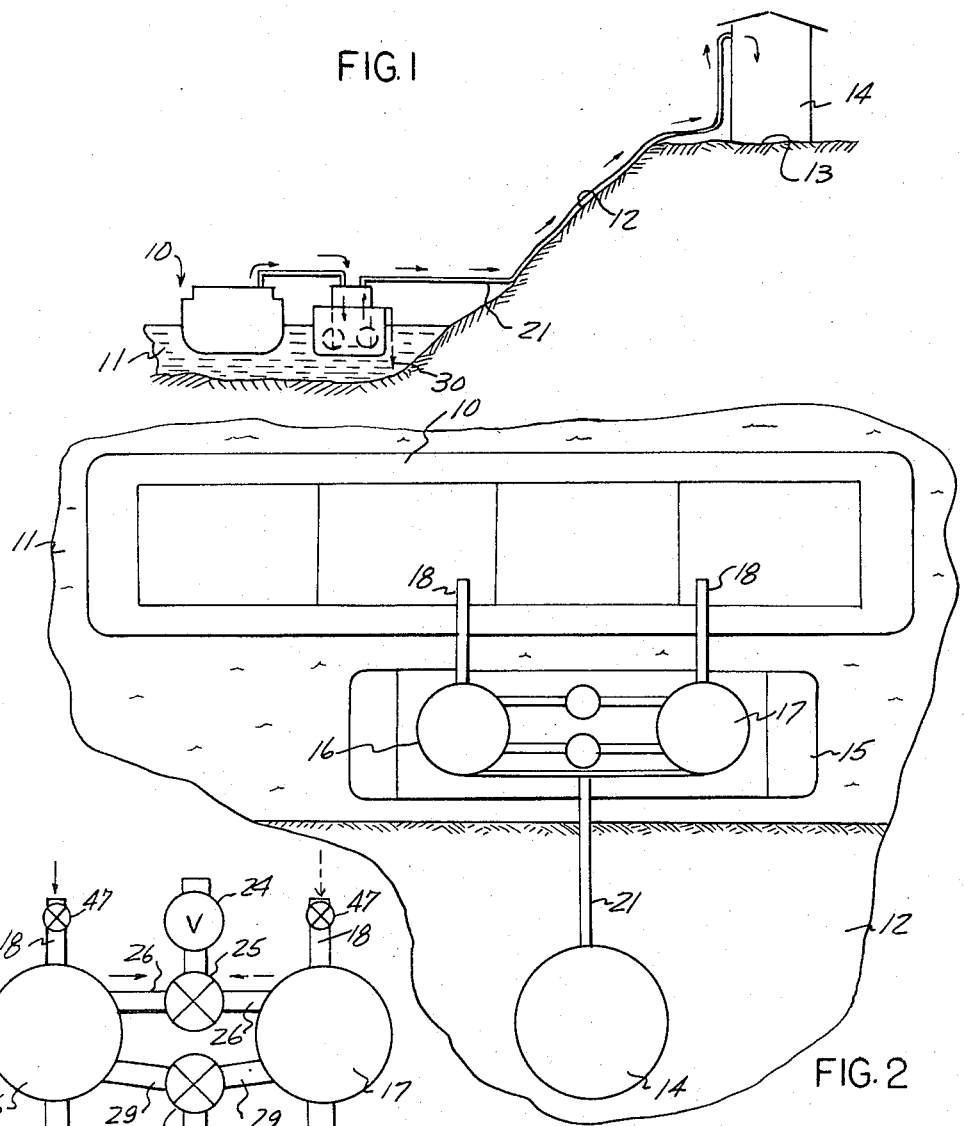
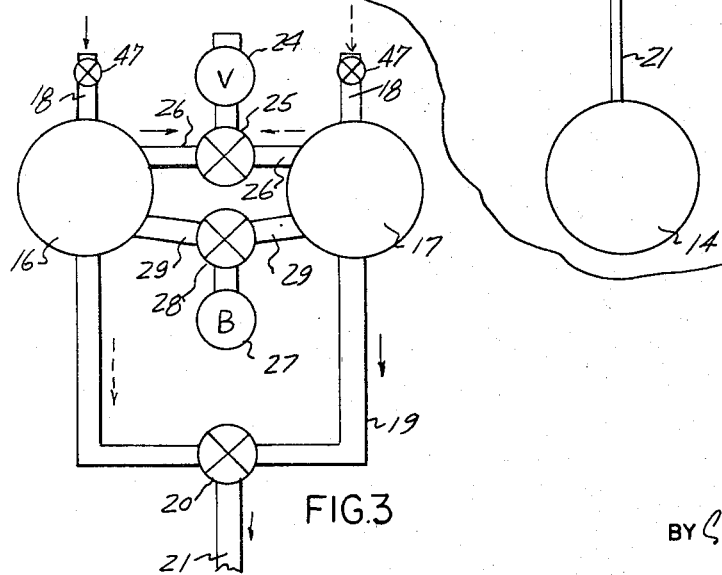
INVENTORS
WERNER OSTBERG
MICHAEL D. CHALLIS
BY Cullen, Sloman, & Cantor
ATTORNEYS

3,373,883
BARGE UNLOADING SYSTEM
Werner Ostberg, Milan, and Michael D. Challis, Ann Arbor, Mich., assignors to Dundee Cement Company, Dundee, Mich.
Filed Nov. 17, 1966, Ser. No. 595,259
1 Claim. (Cl. 214—14)

ABSTRACT OF THE DISCLOSURE

A cement unloading system for transferring dry cement from a barge to a highly elevated silo on a river bank employing an unloading barge with vacuum and pressure equipment.

---

This invention relates to a barge unloading system, and more particularly to apparatus useful for unloading dry, bulk, particulate material from a floating barge and conveying such material to a remotely located position, such as a storage silo located upon land.

One method for unloading a floating barge filled with a bulk, dry, particulate material, such as cement powder and the like, has been by means of vacuum pumps which suck the material from the barge up to an unloading point such as a storage silo located on land near the water's edge. Such a method has been highly effective and economical but has been severely limited in that the deposit location could be not too far above the level of the barge to be unloaded because of the height limitation upon vacuum lifting equipment.

For example, in unloading a barge filled with cement powder the practical limitations upon height of lifting the cement has been approximately 27 feet. This means that the receiving or storage silo or other storage or receiving device, of necessity, had to be less than 27 feet above the height of the barge to be unloaded.

This limitation has been of no particular significance in areas where the river bank or lake edge or the like has been relatively low compared to the water level. However, where the water was surrounded by steep or high banks, such as bluffs along the side of the river, it has not been possible to use this method for unloading barges. Thus, for all practical purposes, barge unloading areas had to be in places where the land adjacent the water's edge was relatively low.

Hence, it is an object of our invention to provide a system for vacuum unloading a barge, with which system the height of the adjacent land becomes irrelevant for practical purposes, since the improved system contemplates vacuum unloading the barge into an area at the same level as the barge and then pressure blowing the material up to the relatively high storage or receiving area. Since the material can be blown upwardly to a change in elevation which is far more than the lift obtainable by vacuum means, this system makes it possible to provide barge unloading facilities in areas of steep banks or bluffs overlooking water's edges.

A further object of this invention is to provide an apparatus for vacuum unloading barges which in effect comprises a floating unloader in the form of a second barge containing vacuum unloading equipment and blower equipment for, first, vacuum unloading a batch of material from the barge, and, then, blowing that batch on to land to the deposit area and then repeating the process until the barge is completely unloaded by vacuum means and the material is conveyed by blower pressure means.

These and other objects and advantages of this invention will become apparent upon reading the following description of which the attached drawings form a part.

In these drawings:

FIG. 1 is a schematic elevational view showing the unloading apparatus and a barge to be unloaded.

FIG. 2 is a plan, schematic view looking down upon the apparatus and barge to be unloaded.

FIG. 3 is a schematic view of the vacuum and blower apparatus in more detail.

FIGS. 1 and 2 schematically illustrate a typical river barge 10 which may be of any size, but which, for example, could be of the large 1500 ton capacity barges used for carrying powdered cement in bulk form. The water 11 could be a river or a lake area bounded by high banks or bluffs 12 having at an upper location a delivery zone 13 upon which a storage silo 14 or the like is mounted.

The object thus is to remove the dry, bulk, particulate material loaded in the barge 10 and convey it to the delivery area, such as the silo 14, which delivery area is located at an elevation considerably above the barge, such as more than the approximately 27 feet, measured vertically, which is the practical limitation upon the height of lift of typically available vacuum pumping equipment.

The unloading apparatus comprises an unloading barge 15 which is adjacent the water's edge and upon which are mounted a pair of large sealed vacuum tanks 16 and 17. These tanks are each provided with suction pipes or hoses 18 whose opposite free ends may be either connected to suitable outlets in the barge 15 or may, for example, be placed right into the mass of cargo.

The tanks are also provided with emptying conduits 19 which are connected to a selector valve 20, in turn connected to a conduit 21 which extends to the land and runs upwardly along the bank 12 to the deposit zone 13, or as illustrated in FIG. 1 to the top of the silo 14. Also mounted upon the barge 15 is a vacuum pump 24 (marked with a V on the drawing) connected by a selector valve 25 to pipes 26 connected to each of the vacuum tanks 16 and 17. In addition, a conventional pressure blower 27 (marked B on FIG. 3) is connected through a selector valve 28 and pipes 29 to the two pressure tanks. Thus, the barge 15 contains all of the essential unloading apparatus and this barge in turn is normally fixed in position, such as for example by means of an anchor or suitable mooring 30.

In operation, the barge 10 is brought alongside of the fixed unloading barge 15 and secured thereto. Next, the suction pipes or hoses 18 are connected to the barge 10 and the vacuum pump 24, which is of conventional construction, is operated through the selector valve 25 to vacuum suck the cargo into vacuum tank 16. When tank 16 is substantially filled, selector valve 25 is reversed so that the vacuum pump 24 now begins to suck cargo into the vacuum tank 17. Meanwhile, the pressure blower 27 is operated through its selector valve 28 to blow the material from tank 16 through the emptying conduit 19 and the selector valve 20 and upwardly through the delivery conduit or pipeline 21 to the silo 14. When tank 17 is substantially filled and tank 16 is substantially empty, the vacuum pump and the blower are again reversed so that at all times one tank is being emptied while the other tank is being filled. With this system, the rapid and effective operation and advantages of the vacuum pump unloading system is preserved while at the same time making it possible to convey the material to elevations far in excess of the normal limitation on vacuum pump lifts. For example, in unloading a 1500 ton powdered cement cargo from a barge with typically available conventional blower and vacuum pumps, the cargo could be emptied at a rate of approximately 100 tons or more per hour and raised to a delivery point whose elevation is in excess of the normal expected limit of 27 feet imposed upon conventional vacuum unloading devices. In addition, the pressure of the blower, which in effect fluidizes the bulk material with air, is such that the material may be conveyed a considerable distance from the water's edge in addition to the considerable height.

To insure the cement from going from tanks 16 and 17 to the cargo carrier barge 10 by way of lines 18 when the pressure is applied by blower 29, it would be obvious to include and there is hereby included shutoff valve 47 as shown in FIG. 3 in lines 18 which are used to shut off lines 18 under such circumstances.

This invention may be further developed within the scope of the following claim. Accordingly, it is desired that the foregoing description be read as being merely illustrative of an operative embodiment of this invention, and not in a strictly limited sense.

Having fully described an operative embodiment of this invention, we now claim:

1. In a system for unloading dry, bulk, particulate material from a floating carrier barge and depositing such material into a receiver at a location on land more than 27 feet above and remote from a water body upon which said carrier barge floats, said system comprising
    (a) a floating carrier barge normally a cargo carrier but now anchored temporarily for unloading and floating on said water body;
    (b) an unloading barge also, but permanently, floated on said water body adjacent the carrier barge to be unloaded and anchored adjacent the bank defining the edge of the water body upon which the two barges are floated;
    (c) a receiver on the land adjacent said water body and remote from and more than 27 feet above said water body water level;
    (d) a vacuum means including collector tanks permanently mounted upon the unloading barge and connected to the carrier barge for unloading the carrier barge by vacuum into the collector tanks of the unloading barge;
    (e) and a pressure blower means permanently but also mounted upon the unloading barge and connecting the collecting tanks of the unloading barge to the receiver for unloading the unloading barge into the receiver.

References Cited
UNITED STATES PATENTS

| | | | |
|---|---|---|---|
| 276,879 | 5/1883 | Randolph | 302—55 |
| 922,190 | 5/1909 | Reno | 214—13 |
| 1,935,843 | 11/1933 | Goebels | 302—53 X |
| 2,819,679 | 1/1958 | Wilson. | |

FOREIGN PATENTS

| | | |
|---|---|---|
| 70,447 | 12/1892 | Austria. |

ANDRES H. NIELSEN, *Primary Examiner.*

EVON C. BLUNK, *Examiner.*

M. L. AJEMAN, *Assistant Examiner.*